US006869068B2

(12) United States Patent
Zhao et al.

(10) Patent No.: US 6,869,068 B2
(45) Date of Patent: Mar. 22, 2005

(54) ELECTRIC CLAMPING DEVICE

(75) Inventors: Kai Zhao, Windsor (CA); Tom Frederick Samrah, Troy, MI (US); Jeff Gerald Kozlowski, Clinton Township, MI (US); Erick William Rudaitis, Sterling Heights, MI (US)

(73) Assignee: SMC Corporation, Tokyo (JP)

( * ) Notice: Subject to any disclaimer, the term of this patent is extended or adjusted under 35 U.S.C. 154(b) by 57 days.

(21) Appl. No.: 10/354,967

(22) Filed: Jan. 31, 2003

(65) Prior Publication Data

US 2004/0150149 A1 Aug. 5, 2004

(51) Int. Cl.[7] .................................................. B23Q 3/08
(52) U.S. Cl. .......................................... 269/32; 269/228
(58) Field of Search ............................ 269/32, 24, 228, 269/27, 237–239, 285, 243

(56) References Cited

U.S. PATENT DOCUMENTS 3,027,155 A 3/1962 Paterson et al.
3,599,957 A 8/1971 Blatt
4,396,183 A 8/1983 Lymburner
4,496,138 A 1/1985 Blatt
4,635,911 A 1/1987 Lovrenich
4,723,767 A 2/1988 McPherson et al.
4,905,973 A 3/1990 Blatt
5,875,417 A 2/1999 Golden
6,003,850 A 12/1999 Crorey
6,070,864 A 6/2000 Crorey
6,199,846 B1 3/2001 Crorey
6,279,886 B1 8/2001 Grossart
6,338,476 B1 1/2002 Takahashi
6,378,856 B1 4/2002 Takahashi
6,422,549 B2 7/2002 Crorey
6,435,494 B2 8/2002 Takahashi et al.
6,471,199 B2 * 10/2002 Nagai et al. .................. 269/32
6,585,246 B2 * 7/2003 McCormick et al. ....... 269/239
6,726,194 B2 * 4/2004 Migliori ..................... 269/225
2001/0000211 A1 4/2001 Crorey
2001/0003388 A1 6/2001 Takahashi et al.
2001/0050455 A1 12/2001 Takahashi
2002/0158394 A1 10/2002 Sawdon et al.
2002/0190455 A1 12/2002 Sawdon
2002/0195761 A1 12/2002 Dellach et al.
2003/0085502 A1 * 5/2003 Migliori ..................... 269/228

FOREIGN PATENT DOCUMENTS

DE 3610060 10/1986
FR 2550115 2/1985

* cited by examiner

*Primary Examiner*—Lee D. Wilson
(74) *Attorney, Agent, or Firm*—Oblon, Spivak, McClelland, Maier & Neustadt, P.C.

(57) ABSTRACT

The present invention provides a low-cost electric clamping device in which a toggle linkage can be actuated by a small low-torque electric motor. The device includes a gear speed reducing mechanism connected to the electric motor, a linkage connected to the speed reducing mechanism, a clamp arm shaft connected to the linkage, and a body 2 for housing them. The linkage includes a crank link connected to a last-stage spur gear of the speed reducing mechanism, a cam follower link which is connected at one end thereof to the crank link and to which a cam follower moving on cam rail faces is rotatably mounted, and a driving lever to which the other end of the cam follower link is connected and which projects from the clamp arm shaft.

10 Claims, 10 Drawing Sheets

ELECTRIC CLAMPING DEVICE

TECHNICAL FIELD OF THE INVENTION

The present invention relates to an electric clamping device for clamping a workpiece for a purpose of working and the like.

PRIOR ART

In an automatic assembly line or the like in the automobile industry, a clamping device for clamping a workpiece for a purpose of working is used frequently. A fluid pressure cylinder is used conventionally as a driving source for driving the clamping device and a clamp arm is rotated by a driving force of an air cylinder, for example, to generate a clamping force.

However, the prior-art clamping device requires air piping. A piping operation is complicated, a space for installation is limited by a plurality of tubes used for the air piping, the device is upsized, and a cost is increased due to an air leakage and the like.

To cope with such problems, there is a known electric clamping device in which an electric motor is used as a driving source (e.g., a specification of U.S. Pat. No. 6,354,580).

In the above known electric clamping device, however, it is customary to convert a driving force of the electric motor into a linear motion by a gear mechanism and a feed screw mechanism and to convert the linear motion transferred by the feed screw mechanism into a rotational motion by a toggle linkage to rotate a clamp arm. Because a speed reducing mechanism is formed of the gear mechanism and the feed screw mechanism, a structure of the speed reducing mechanism is complicated and a cost is high.

SUMMARY OF THE INVENTION

It is an object of the present invention to solve the above problems and to provide a small low-cost electric clamping device without problems associated with air piping and in which a toggle mechanism can be actuated by a small low-torque electric motor and which has a large clamping force while saving energy.

It is another object of the invention to provide an electric clamping device in which a varying manner of a clamping force immediately before a clamping position can be set arbitrarily by simple means, i.e., a slight change in cam rail faces.

To achieve the above objects, according to the invention, there is provided an electric clamping device, wherein an electric motor, a speed reducing mechanism formed of multistage spur gears to reduce a speed of rotation of the electric motor, a linkage connected to the speed reducing mechanism, and a clamp arm shaft to which a clamp arm connected to the linkage is mounted are retained on a body, the linkage includes a crank link which is rotatably connected at an end thereof to a crank gear formed of a last-stage spur gear of the speed reducing mechanism and which converts a rotational motion of the spur gear into a linear motion, a cam follower link rotatably connected to a tip end of the crank link and bent at an intermediate portion such that a cam follower moving on a cam rail face provided to the body is rotatably supported on the bend, and a driving lever projecting from the clamp arm shaft to be connected to a tip end of the cam follower link, and the linkage forms a toggle linkage for stably retaining a clamping force of the clamp arm together with the cam rail face.

The cam rail face in the electric clamping device is formed of a linear cam face making up a major part of a length of the cam rail face and a curved cam face formed of an arc having a large radius of curvature or a curve which approximates the arc near an end portion of the cam rail face. In this case, the curved cam face is in a position where the cam follower rolls in a range of 5° immediately before a final clamping position of the clamp arm or the entire cam rail face can be substantially formed of a linear cam face or the like.

In a preferred embodiment of the electric clamping device, the device further comprises a brake mechanism for retaining the clamp arm in an open state, the brake mechanism being formed of a brake shoe made of soft material or preferably a rubber-like elastic body disposed so as to partially enter between cogs of a large-diameter spur gear of the speed reducing mechanism engaged with a small-diameter spur gear fixed to an output shaft of the electric motor and a solenoid for driving the brake shoe in such directions that the brake shoe comes in contact with and separates from the cogs of the spur gear.

In the electric clamping device, it is possible that a shaft end of a gear shaft of the large-diameter spur gear of the speed reducing mechanism engaged with the small-diameter spur gear fixed to the output shaft of the electric motor is caused to face an outside of the body and that a locking portion to be rotated with a manual tool is provided to the shaft end to enable the clamp arm to be manually operated. Moreover, it is possible that a shaft end of a last-stage gear shaft of the speed reducing mechanism is caused to face the outside of the body, that an indicator is provided to the shaft end, and that an angle scale for reading a rotating angle of the indicator is provided to the body to form indicating means for indicating a rotating state of the clamp arm shaft.

The electric clamping device further comprises a controller for controlling operation of the device, wherein an input signal connector to which a signal for controlling the electric clamping device is input, an output signal connector from which a signal for confirming opening/closing of the clamp arm is output to an outside, a position sensor for sending a signal of a position of the clamp arm, setting means for setting various driving conditions, and a control panel provided with indicating means for indicating various operating states and abnormal conditions are connected to a microprocessor in the controller through an I/O interface and the electric motor whose driving, a stop, a switch in a rotating direction are controlled and a solenoid of a brake mechanism for retaining the clamp arm in an open state are connected to the microprocessor through a motor driver.

In such an electric clamping device of the invention, because the speed reducing mechanism is formed of the multistage spur gears only, a structure of the speed reducing mechanism becomes simple and a cost can be reduced. Because a speed of the crank mechanism for converting the rotational motion of the spur gear into the linear motion is reduced near the end of a stroke to increase a thrust, it is possible to clamp a workpiece with a large force by actuating the toggle mechanism by a small low-torque motor.

Furthermore, in the electric clamping device of the invention, the linkage is formed of the crank link connected to the last-stage spur gear, the cam follower link having the cam follower moving on the cam rail face, and the driving lever connected to the tip end of the cam follower link, the toggle linkage is formed of them, and output torque while the clamp arm rotates from the fully-open position to the fully-closed position can be set arbitrary by the shape of the cam rail face. Therefore, it is possible to output an appropriate clamping force, e.g., suddenly increase the clamping force near the clamping position in spite of small average output torque. Because a reaction force from the workpiece when the workpiece is clamped is received by the cam rail face provided to the body, it is possible to reduce a reaction force applied to the crank mechanism and the speed reducing mechanism.

DESCRIPTION OF THE EMBODIMENT

FIGS. 1 to 8 show an embodiment of an electric clamping device according to the present invention. The electric clamping device 1 has a thin body 2 substantially in a shape of a rectangular parallelepiped. The body 2 is formed of first and second body pieces 2*a* and 2*b* having opposed wall faces and peripheral wall faces. The first and second body pieces 2*a* and 2*b* are coupled by screwing a plurality of coupling bolts 3*b* down into screw holes 3*a* provided to corner portions of the second body piece 2*b* from an outer face side of the first body piece 2*a* to form a housing space 4 surrounded with the wall faces of the first and second body pieces 2*a* and 2*b* inside the body 2.

At an end portion of the first body piece 2*a* of the body 2, a recessed portion 3*c* for housing a head portion of an electric motor 6 and a hole through which an output shaft 6*a* of the electric motor 6 is inserted are provided. The output shaft 6*a* of the electric motor 6 is inserted through the hole into the housing space 4 in the body 2 and the electric motor 6 is fixed with the head portion thereof fitted in the recessed portion 3*c* of the body piece 2*a*.

Figure 4:
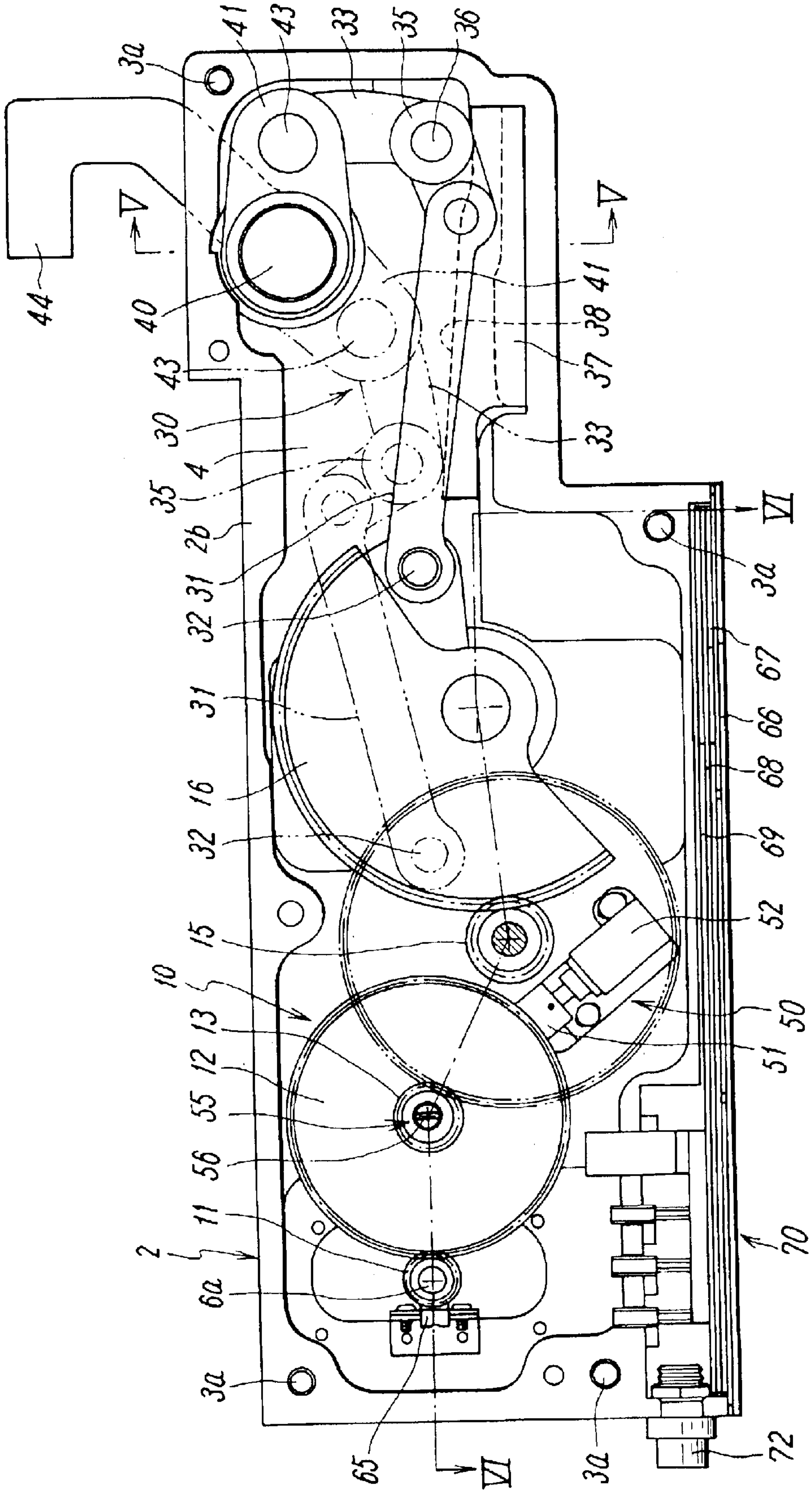
FIG. 4 is a front view of a structure of an inside mechanism of the embodiment with one of body pieces detached.
Figure 6:
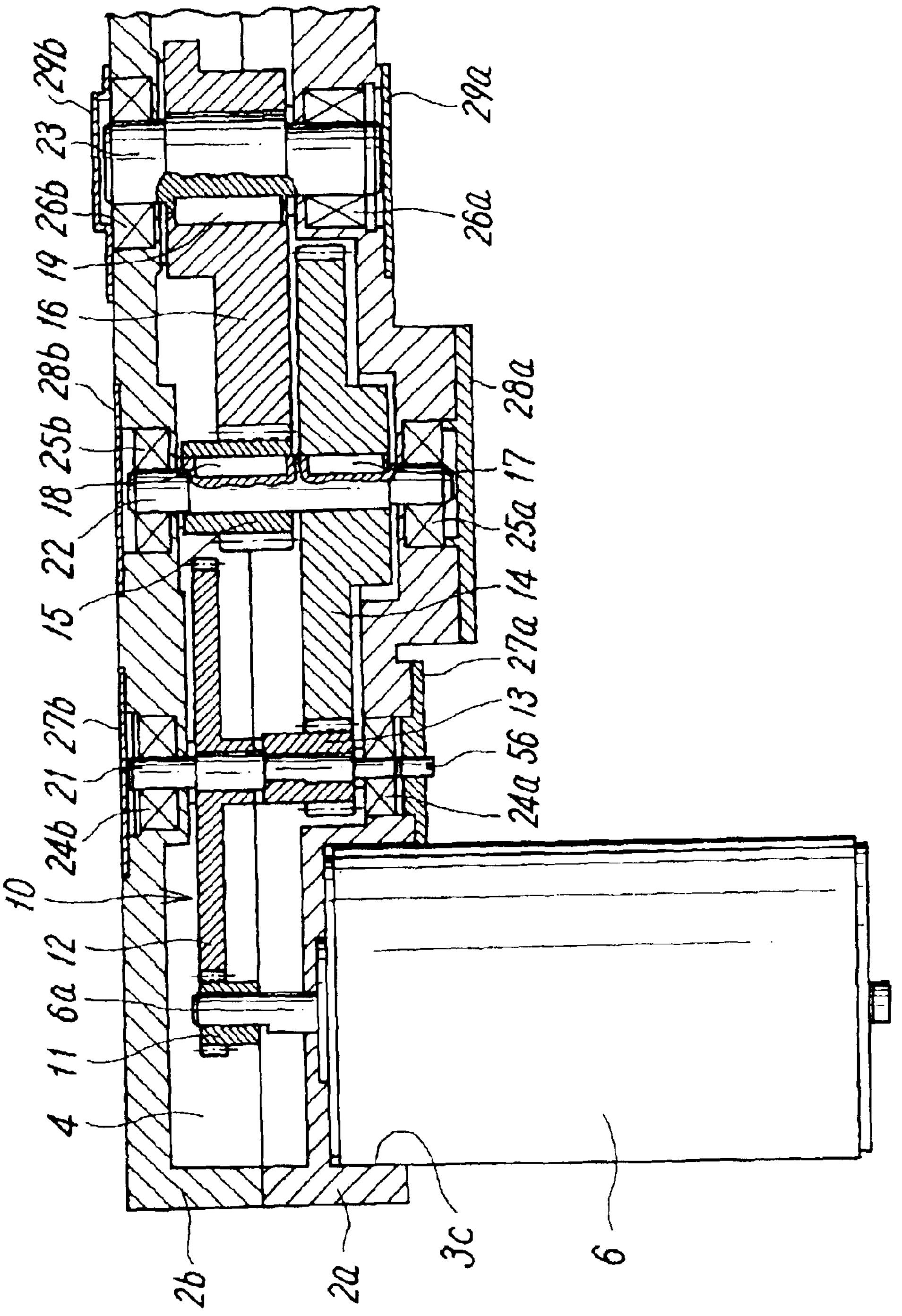
FIG. 6 is a sectional view taken at a VI—VI position in FIG. 4.
Figure 7:
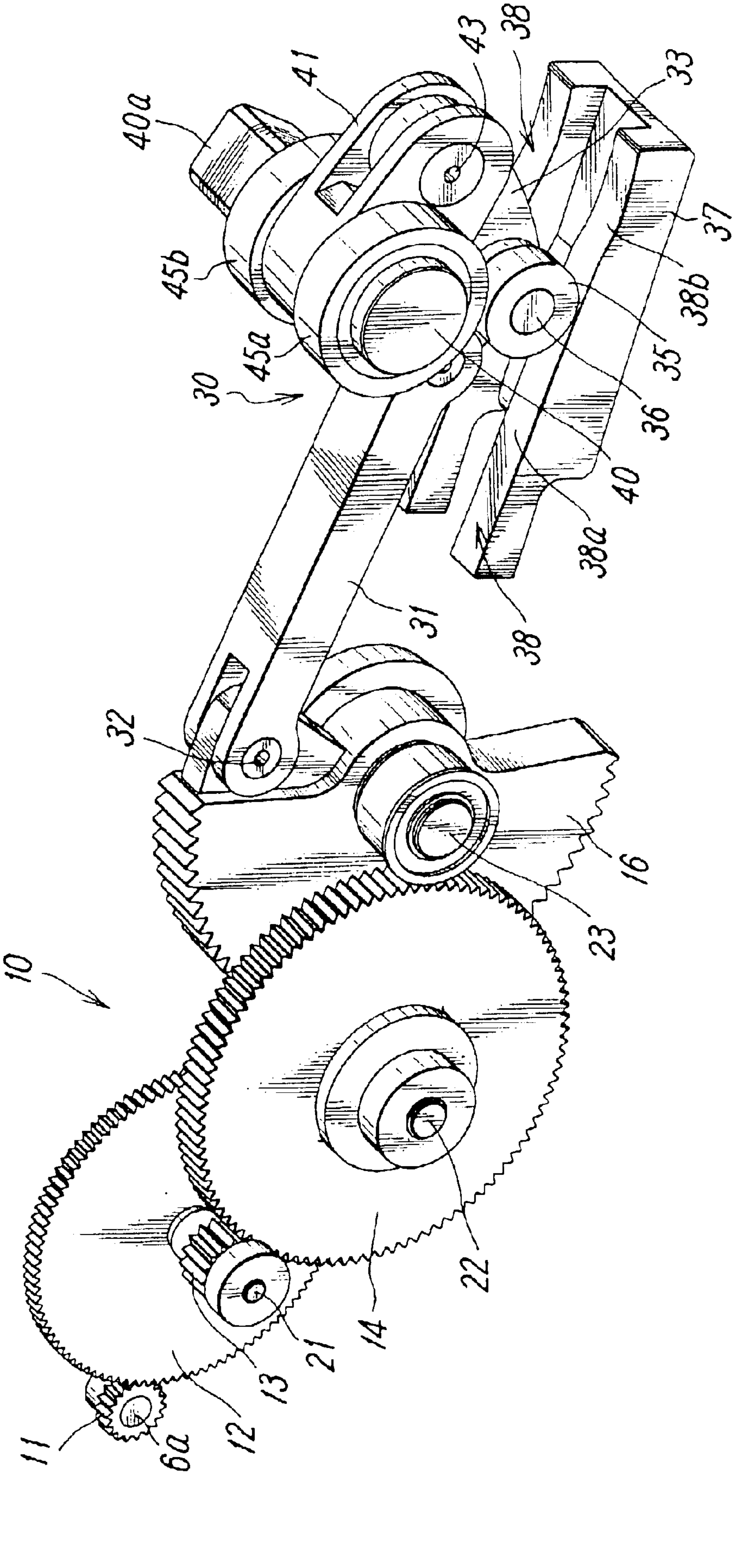
FIG. 7 is a perspective view of structures of a speed reducing mechanism and a linkage used for the embodiment.

Housed in the housing space 4 in the body 2 are, as clearly shown in FIGS. 4, 6, and 7, a speed reducing mechanism 10 formed of a plurality of spur gears for reducing a speed of rotation of the output shaft 6*a* of the electric motor 6 and a linkage 30 connected to the speed reducing mechanism 10.

The speed reducing mechanism 10 includes a small-diameter spur gear 11 fixed to the output shaft 6*a* of the electric motor 6, a large-diameter spur gear 12 fixed to a first gear shaft 21 parallel to the output shaft 6*a* of the electric motor 6 and engaged with the spur gear 11, a small-diameter spur gear 13 fixed to the first gear shaft 21, a large-diameter spur gear 14 fixed to a second gear shaft 22 and engaged with the spur gear 13, a small-diameter spur gear 15 fixed to the second gear shaft 22, and a large-diameter and substantially semicircular spur gear 16 fixed to the third gear shaft 23 and engaged with the spur gear 15.

Because the last-stage spur gear 16 to which a crank link 31 is connected in the linkage 30 functions as a crank gear for causing a clamp arm 44 to operate in a range in which the spur gear 16 rotates substantially a half turn, the spur gear 16 can be formed in the substantially semicircular shape to omit the other half of the circular shape.

It is needless to say that the spur gears 11 to 16 are respectively fixed to the output shaft 6*a* of the electric motor 6 and the first to third gear shafts 21 to 23. Furthermore, as shown in FIG. 6, for the second and third gear shafts 22 and 23 in which a driving force is increased due to speed reduction, keys 17, 18, and 19 are used for firmly fixing the spur gears 14 to 16 to the second and third gear shafts 22 and 23 in response to increases in a transferred force.

The first to third gear shafts 21 to 23 are rotatably supported by bearings provided to the opposed wall faces of the first and second body pieces 2*a* and 2*b*. In other words, bearings 24*a* and 24*b* of the first gear shaft 21 are respectively inserted and fixed into through holes formed to face each other in the wall faces of the first and second body pieces 2*a* and 2*b* and covers 27*a* and 27*b* with which the through holes are closed are mounted to the first and second body pieces 2*a* and 2*b* by bolts. Bearings 25*a* and 25*b*, 26*a* and 26*b* of the second and third gear shafts 22 and 23 are similarly and respectively inserted and fixed into through holes formed to face each other in the wall faces of the first and second body pieces 2*a* and 2*b* and covers 28*a* and 28*b*, 29*a* and 29*b* are mounted to the through holes.

Therefore, rotation of the output shaft 6*a* of the electric motor 6 is transferred from the small-diameter spur gear 11 on the output shaft 6*a* to the large-diameter spur gear 12 with a speed of the rotation being reduced. Rotation of the spur gear 12 is transferred to the large-diameter spur gear 14 on the second gear shaft 22 through the gear shaft 21 and the small-diameter spur gear 13 and rotation of the spur gear 14 is transferred to the large-diameter spur gear 16 through the gear shaft 22 and the small-diameter spur gear 15. Finally, rotation of the electric motor 6 is transferred to the last-stage spur gear 16 with a speed of the rotation being substantially reduced by multistage spur gears and torque being increased.

The linkage 30 includes the crank link 31 having an end rotatably connected to the last-stage spur gear 16 by a pin 32 as clearly shown in FIGS. 4 and 7. The crank link 31 is for converting a rotational motion of the spur gear 16 into a linear motion and an end of a cam follower link 33 is rotatably connected to a tip end of the crank link 31. The cam follower link 33 is bent at its intermediate portion and cam followers 35 are rotatably supported by a cam follower shaft 36 provided to the bend as clearly shown in FIG. 4. The tip end of the cam follower link 33 is rotatably connected by a connecting shaft 43 to a tip end of a driving lever 41 projecting from a clamp arm shaft 40 rotatably supported by the body 2. The bend of the cam follower link 33 is formed by bending the cam follower link 33 at substantially a right angle or at an angle which approximates the right angle with the tip end of the cam follower link 33 facing the tip end of the driving lever 41.

Figure 11:
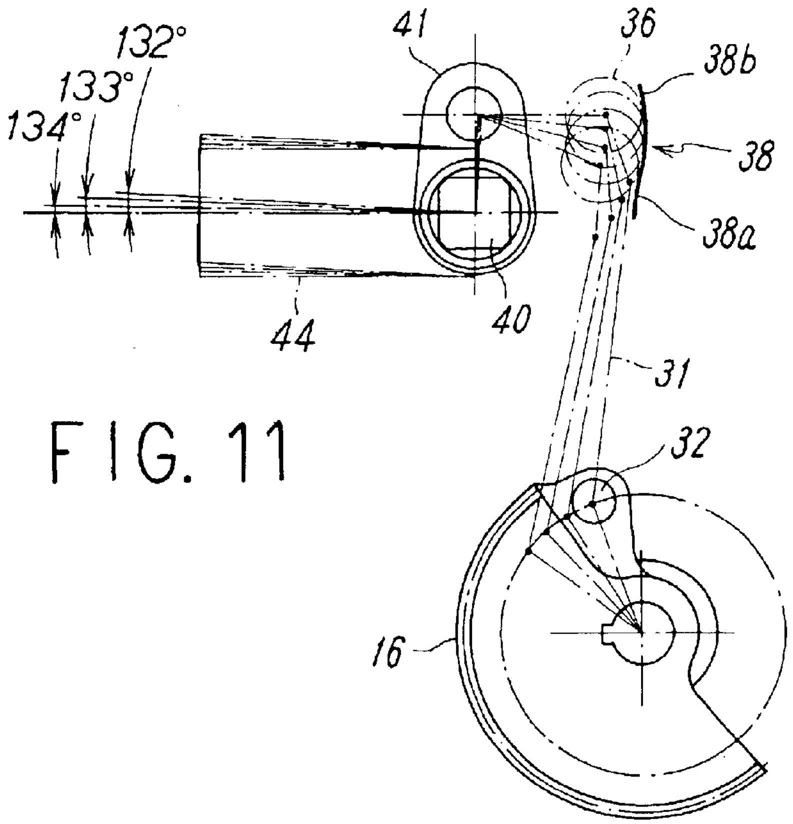
FIG. 11 is an explanatory view of a rotating manner of a linkage for the last arm angle of 5° (131° to 135°) before the clamping position of the linkage having cam rail faces of the embodiment.
Figure 12:
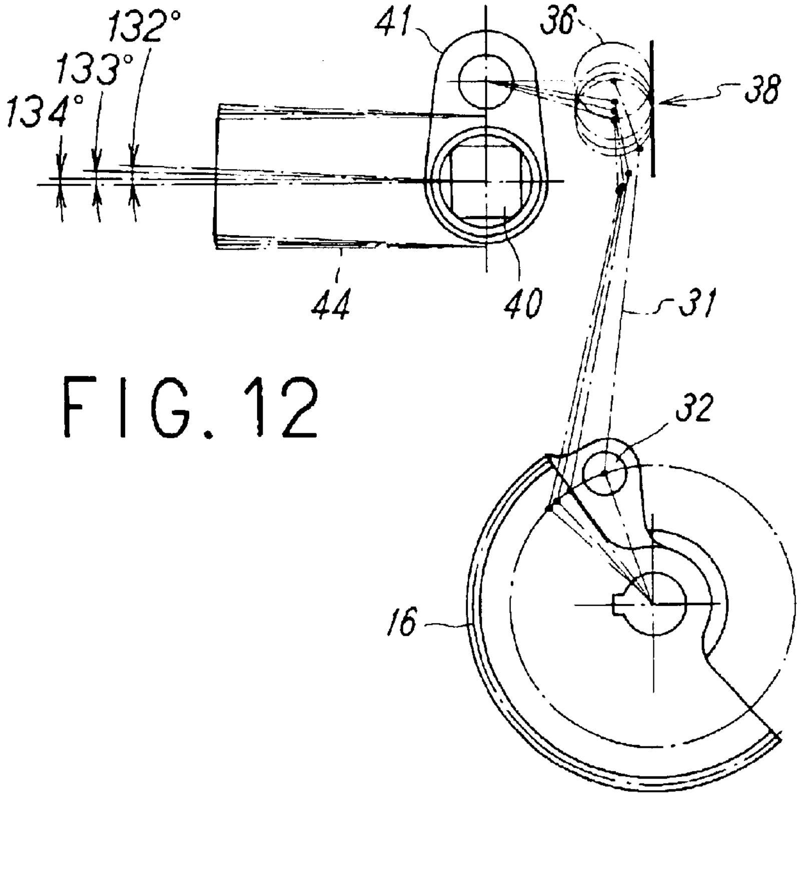
FIG. 12 is an explanatory view of a rotating manner of the linkage for the last arm angle of 5° (131° to 135°) when the cam rail faces are linear.

As shown in FIG. 7, the cam followers 35 are in a form of a pair of rollers supported on opposite ends of the cam follower shaft 36 retained by the cam follower link 33. For the cam followers 35, the body 2 is provided with a rail body 37 having a pair of cam rail faces 38 corresponding to both the cam followers 35 to allow the cam followers 35 to roll along predetermined paths. The cam rail faces 38 extend along linear directions in which the tip end of the crank link 31 moves and is formed into appropriate shapes so as to obtain a predetermined clamping force which will be described later. To put it concretely, each the cam rail face 38 may be formed into a substantially linear shape as a whole as shown in FIG. 12 or may be formed of a linear cam face 38*a* making up a major part of a length of the cam rail face and a successive cam face 38*b* formed of an arc having a large radius of curvature or a curve which approximates the arc near an end portion (clamping force generated portion) as shown in FIGS. 7 and 11.

Figure 1:
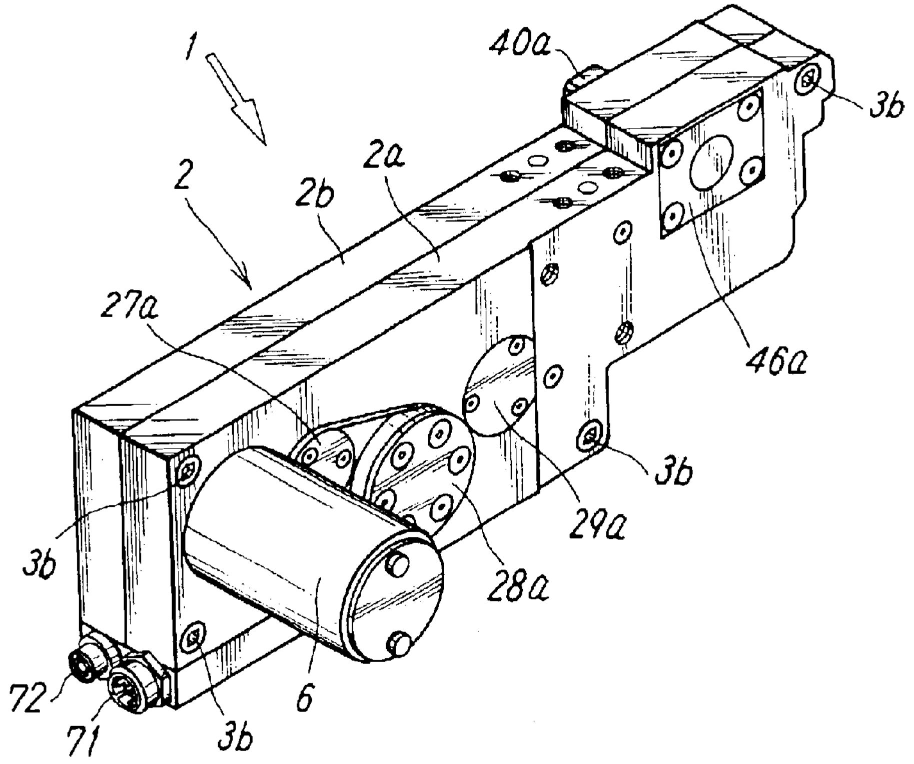
FIG. 1 is a perspective view of an embodiment of a clamping device according to the present invention.
Figure 2:
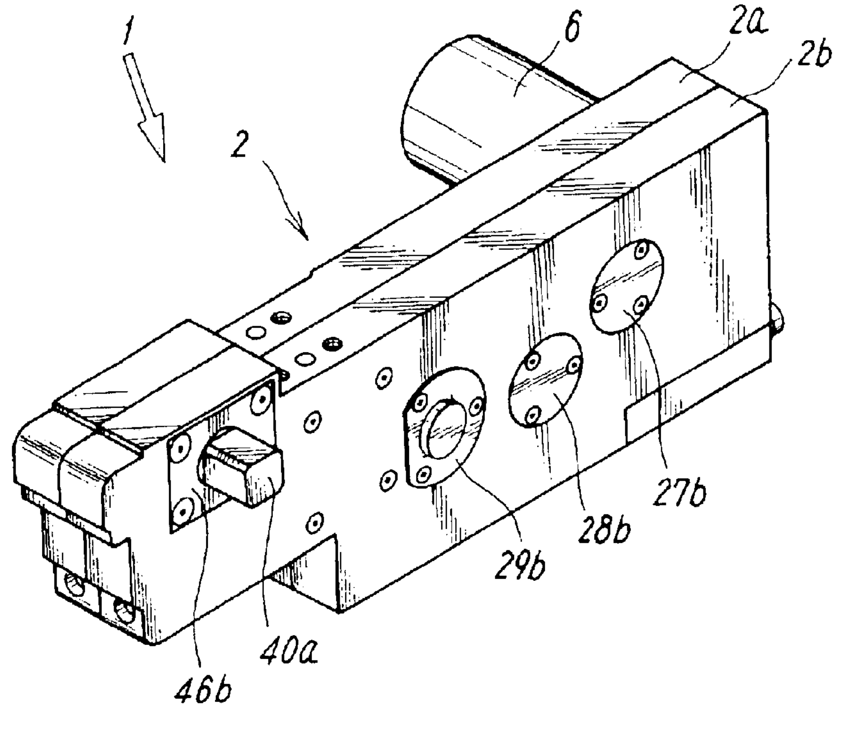
FIG. 2 is a perspective view of the embodiment viewed from an opposite side.
Figure 3:
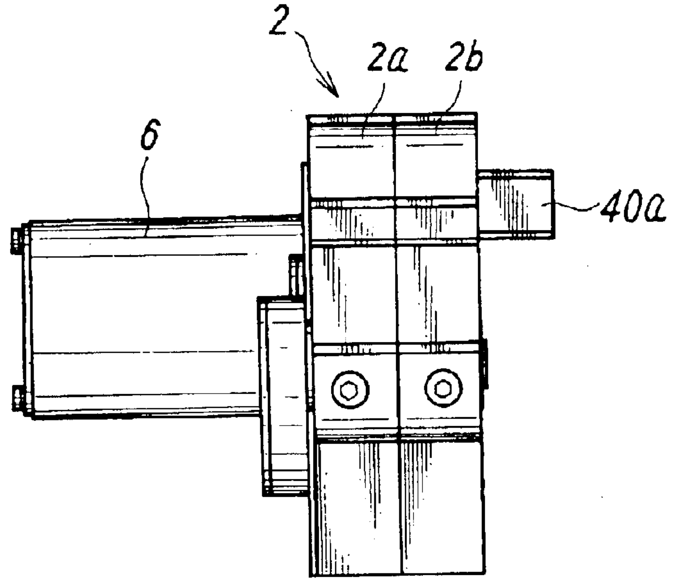
FIG. 3 is a side view of the embodiment viewed from a right end side in FIG. 1.
Figure 5:
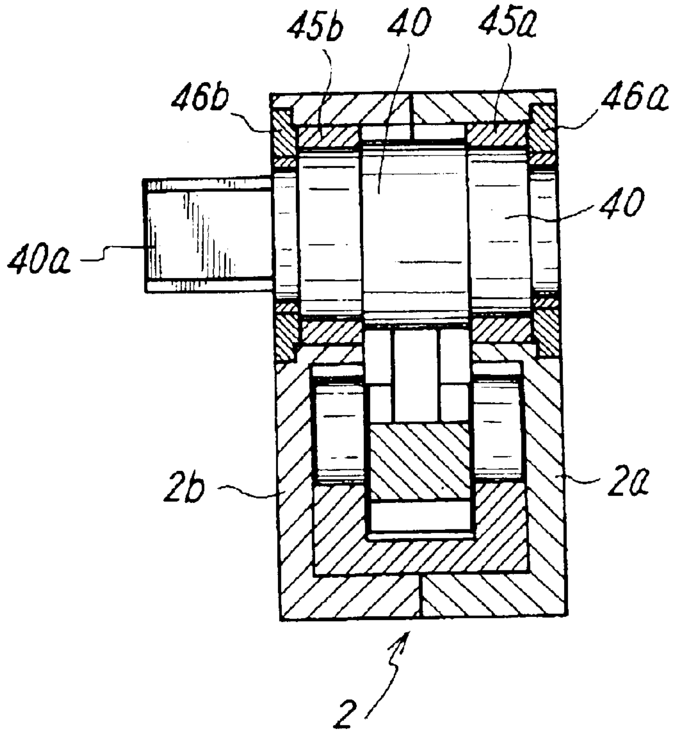
FIG. 5 is a sectional view taken at a V—V position in FIG. 4.
Figure 8:
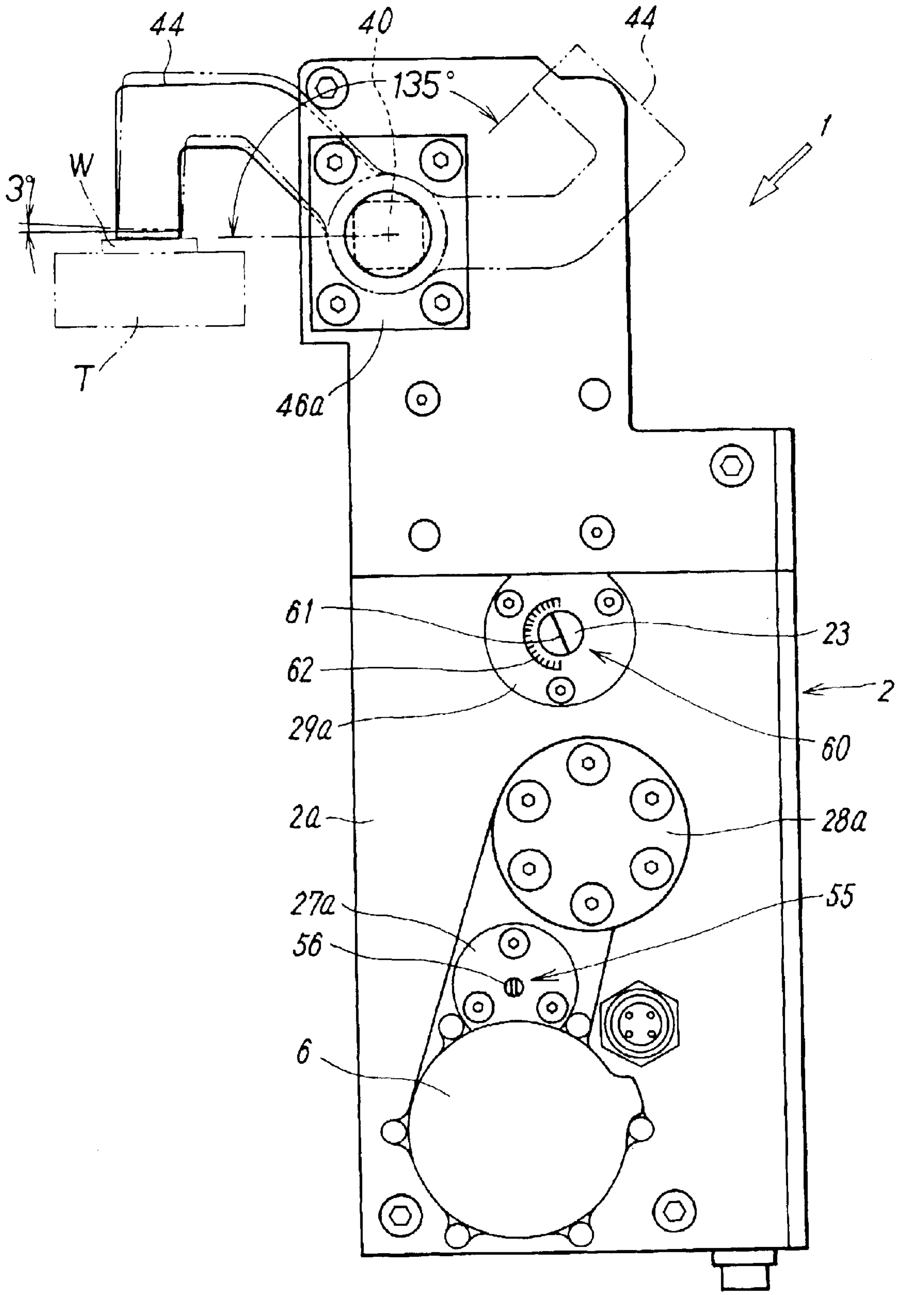
FIG. 8 is an external view also illustrating a state in which a clamp arm in the embodiment is clamping a workpiece from a front side.

The clamp arm shaft 40 driven for rotation by the driving lever 41 includes a shaft end 40*a* projecting from the body 2 and formed of an angular shaft and a base end of the clamp arm 44 is mounted to the shaft end 40*a* as shown in FIG. 8. The clamp arm shaft 40 is rotatably mounted to the body 2 through a pair of bearing members 45*a* and 45*b* as shown in FIG. 5. The bearing members 45*a* and 45 bare mounted in through holes formed in opposed positions of the first and second body pieces 2*a* and 2*b* and are retained by covers 46*a* and 46*b* fixed to the body pieces 2*a* and 2*b* by bolts.

In the linkage 30 having the above structure, if the last-stage spur gear 16 is rotated and driven by driving of the speed reducing mechanism 10 from a position shown in chain lines in a direction shown with an arrow to a position shown in solid lines in FIG. 4, the rotational motion is transferred to the crank link 31 as a linear motion. Because the other end of the cam follower link 33 connected to the tip end of the crank link 31 is connected to the driving lever 41 fixed to the clamp arm shaft 40, the cam follower link 33 moves toward a position shown in solid lines in FIG. 4 with the cam followers 35 provided to the bend of the cam follower link 33 coming in contact with and rolling on the cam rail faces 38 of the rail body 37 and the cam follower link 33 itself rotating about the cam follower shaft 36 while causing the driving lever 41 to rotate from a position shown in chain lines to a position shown in solid lines. As a result, the clamp arm 44 is driven by the clamp arm shaft 40 for rotation in a range of 135° in FIG. 8.

The linkage 30 formed of the crank link 31, the cam follower link 33, and the driving lever 41 forms a toggle linkage for stably retaining the clamping force of the clamp arm 44 together with the cam rail faces 38 on which the cam follower 35 rolls.

FIG. 8 shows a state in which a workpiece W placed on a clamp table T is clamped by using the electric clamping device 1 and shows states in which the clamp arm 44 is in a clamping position (fully-closed position of the clamp arm), 3° before the position, and 135° before the clamping position (in a fully-open position of the clamp arm).

Figure 9:
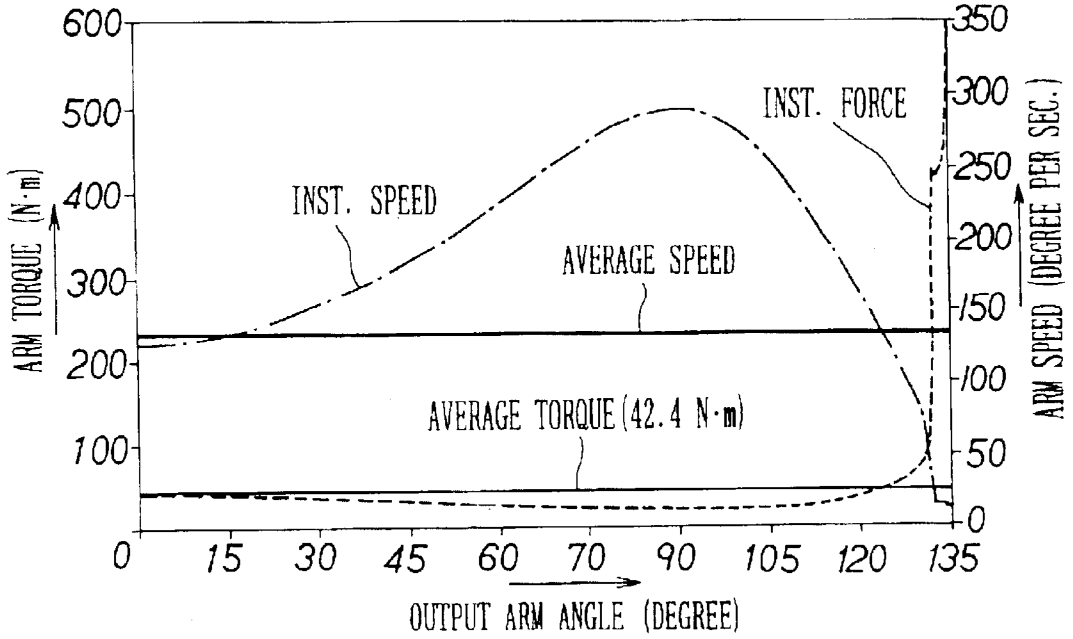
FIG. 9 is a graph showing a relationship between output torque and speed for an arm angle of the clamp arm in the clamping device of the embodiment.
Figure 10:
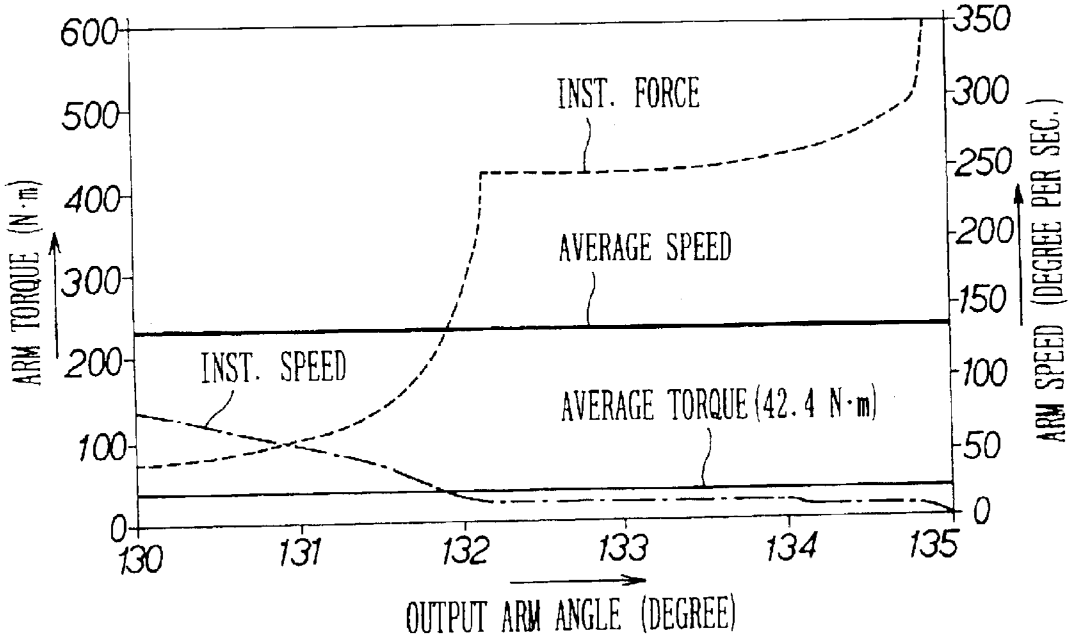
FIG. 10 is a graph showing a relationship between the output torque and the speed for the last arm angle of 5° before the clamp arm in the clamping device of the embodiment reaches the fully-closed position.

FIG. 9 shows a relationship between output torque and speed of the clamp arm for arm angles from the fully-open position (0°) to the fully-closed position (135°) of the clamp arm when the cam rail faces 38 of the rail body 37 in the electric clamping device 1 have the cam faces 38*a* and 38*b* as shown in FIGS. 4 and 7. FIG. 10 shows output torque and speed of the clamp arm for the last arm angles of 5° before the clamp arm 44 reaches the fully-closed position with a horizontal axis indicating an arm angle with an enlarged scale of the angle.

The electric clamping device used for measurement of the output torque and speed is the device shown in FIG. 8 in which a distance between a clamp portion at a tip end of the clamp arm 44 and a center of rotation of the clamp arm 44 is 76.2 mm and an output of the electric motor is of 100 watts.

Referring to FIG. 9, an average speed of the clamp arm from the fully-open position to the fully-closed position is about 135°/second. While the speed is lower than the average speed near the fully-open position, the speed increases as the arm angle increases from the fully-open position, reaches the maximum value at the arm angle of about 90°, is sharply reducing until the arm reaches a position (the arm angle of about 132°) immediately before the fully-closed position, and is very low but stable when the arm angle exceeds the angle of about 132° near the clamping position (see FIG. 10). This and a fact that only a second is required for the clamp arm to rotate from the fully-open position to the fully-closed position are highly desirable as an operation of the clamp arm.

With regard to output torque of the clamp arm, while average output torque from the fully-open position to the fully-closed position is 42.4 N·m which is very small, the torque sharply increases immediately before the fully-closed position (the arm angle of about 132°) (see FIG. 10). This variation in the output is highly desirable as the output of the clamp arm and it is possible to clamp the workpiece with a large force even if the motor is small and of low torque.

As described above, if each of the cam rail faces 38 of the rail body 37 is formed of the linear cam face 38*a* and the curved cam face 38*b* formed of the arc having the large radius of curvature or the curve which approximates the arc as shown in FIGS. 4 and 7, the stable and large output torque can be obtained immediately before the fully-closed position of the clamp arm 44. However, by changing the shape of each the cam rail face 38, it is possible to arbitrarily adjust the output torque. The cam rail faces 38 can be changed easily by exchanging the rail body 37 with one having other cam rail faces.

FIGS. 11 and 12 are for explaining differences in a rolling state of the linkage near the clamping position and in the clamping force due to a difference in the cam rail faces. FIG. 11 shows the a rolling manner of the linkage for the last arm angles of 5° (131° to 135°) before reaching the clamping position of the linkage 30 in a case in which the rail body 37 having the cam faces 38*a* and 38*b* according to the above embodiment is used and FIG. 12 shows the similar rolling manner of the linkage but shows a case in which linear cam rail faces 38 are used.

Figure 13:
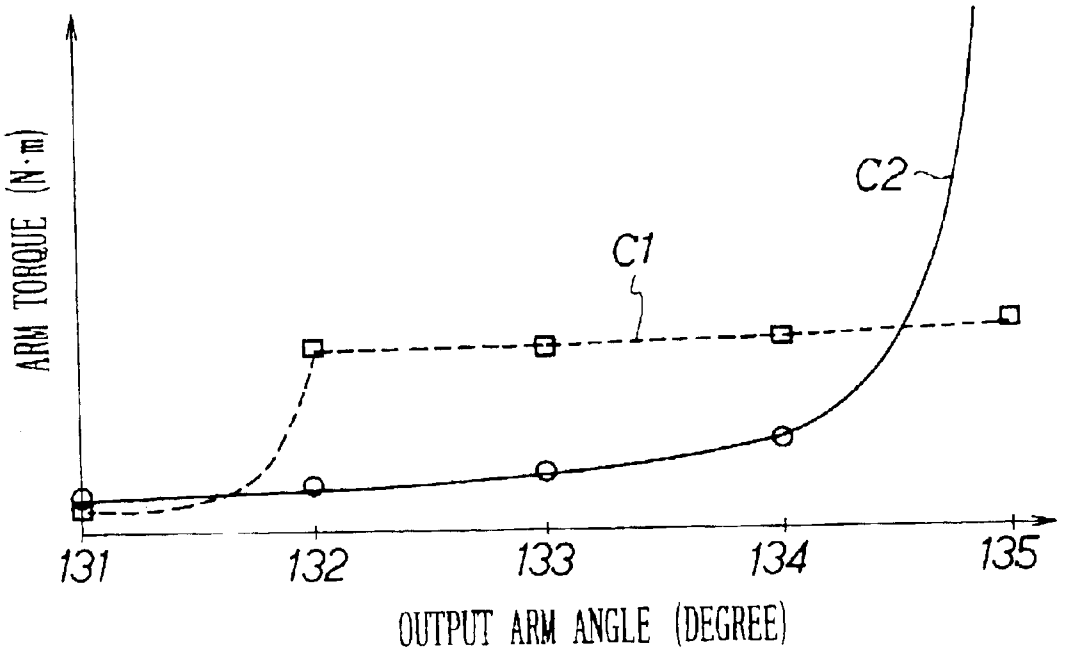
FIG. 13 is a graph putting clamping forces for the last arm angle of 5° (86° to 90°) before the clamping position in cases in FIGS. 11 and 12 in contrast with each other.

FIG. 13 puts clamping forces in the cases in FIGS. 11 and 12 in contrast with each other, in which a curve C1 indicates the clamping force in the case in FIG. 11 and a curve C2 indicates the clamping force in the case in FIG. 12. In FIG.

13, the case of the curve C1 has a tendency similar to the case in FIG. 10, but it can be understood from FIG. 11 that the clamping force is substantially constant after the arm angle of 132° because each the cam rail face 38 has the arc-shaped cam face 38*b* formed successively from the linear cam face 38*a* to be slightly recessed from the cam face 38*a*. In the case of the curve C2, the clamping force sharply increases from the arm angle of about 134°. Therefore, it can be understood that the clamping force, i.e., the output torque can be adjusted arbitrarily by slightly changing the cam rail faces.

Next, a brake mechanism 50, a manual operation mechanism 55, and the like applied to the electric clamping device 1 will be described.

The brake mechanism 50 provided to the electric clamping device 1 is for retaining the clamp arm 44 in an open state. In other words, when the clamp arm 44 is open, a position of the clamp arm 44 is detected by a position sensor which will be described later and the clamp arm 44 is stopped by a dynamic brake of the electric motor 6 when the clamp arm 44 reaches a set position. After the stop of the clamp arm 44, the clamp arm 44 is retained by the brake mechanism 50.

As clearly shown in FIG. 4, the brake mechanism 50 includes a brake shoe 51 made of soft material and disposed to partially enter between cogs of the large-diameter spur gear 12 engaged with the first spur gear 11 of the speed reducing mechanism 10 and a solenoid 52 for driving the brake shoe in such directions that the brake shoe comes in contact with and separates from the cogs of the spur gear 12. When the clamp arm 44 is in an open state, the brake mechanism 50 pushes the brake shoe 51 against the cogs of the spur gear 12 to restrict movement of the clamp arm 44. The brake shoe 51 may be formed of a rubber-like elastic body, for example. With the brake mechanism 50 having such a structure, it is possible to obtain a stable braking operation even if a stop position of the clamp arm 44 changes.

In the electric clamping device 1, the gear shaft 21 of the second spur gear 12 engaged with the first spur gear 11 of the speed reducing mechanism 10 is provided with the manual operation mechanism 55 for manually rotating the spur gear 12. The manual operation mechanism 55 is formed by causing a shaft end of the gear shaft 21 to face a small hole provided to the cover 27*a* of the shaft end and providing a locking portion 56 formed of a groove or the like into which a tip end of a manual tool such as a screwdriver to the shaft end as shown in FIGS. 4, 6, and 8. Because the manual operation mechanism 55 is provided to the gear shaft near the electric motor 6, it is easy to manually drive the clamp arm 44 with the screwdriver or the like at the time of a power failure or a malfunction. When the clamp arm 44 stops with the workpiece clamped, for example, it is possible to manually rotate the clamp arm 44 to cancel the clamping state.

Furthermore, the electric clamping device 1 may be provided with indicating means 60 for indicating a rotating state of the clamp arm shaft 40 as shown in FIG. 8 if necessary. The indicating means 60 is formed by causing a shaft end of the gear shaft 23 of the last-stage spur gear 16 of the speed reducing mechanism 10 to face a small hole provided to the cover 29*a*, providing an indicator 61 to the shaft end, and providing an angle scale 62 for reading a rotating angle of the indicator 61 to a periphery of the shaft end on the body piece 2*a*. The indicator 61 may be formed of a linear pit or projection or an arrow formed in a shaft end face of the gear shaft 23. A reference numeral 63 in FIG. 8 designates an auxiliary power supply joint connector.

Next, a control system of the electric clamping device 1 will be described by reference to FIG. 14.

The electric clamping device 1 is provided with a controller 70 for controlling driving of the clamp arm shaft 40 by the electric motor 6, an operation of the brake mechanism 50, and the like and for carrying out required indication of an operation (see FIG. 4).

For control by the controller 70, the electric clamping device 1 is provided with a position sensor 65 for detecting a rotating position of the clamp arm shaft 40 near the spur gear 11 fixed to the output shaft 6*a* of the electric motor 6. The position sensor 65 detects the position of the clamp arm 44 as the number of pulses by counting the number of passing cogs of the spur gear 11.

Figure 14:
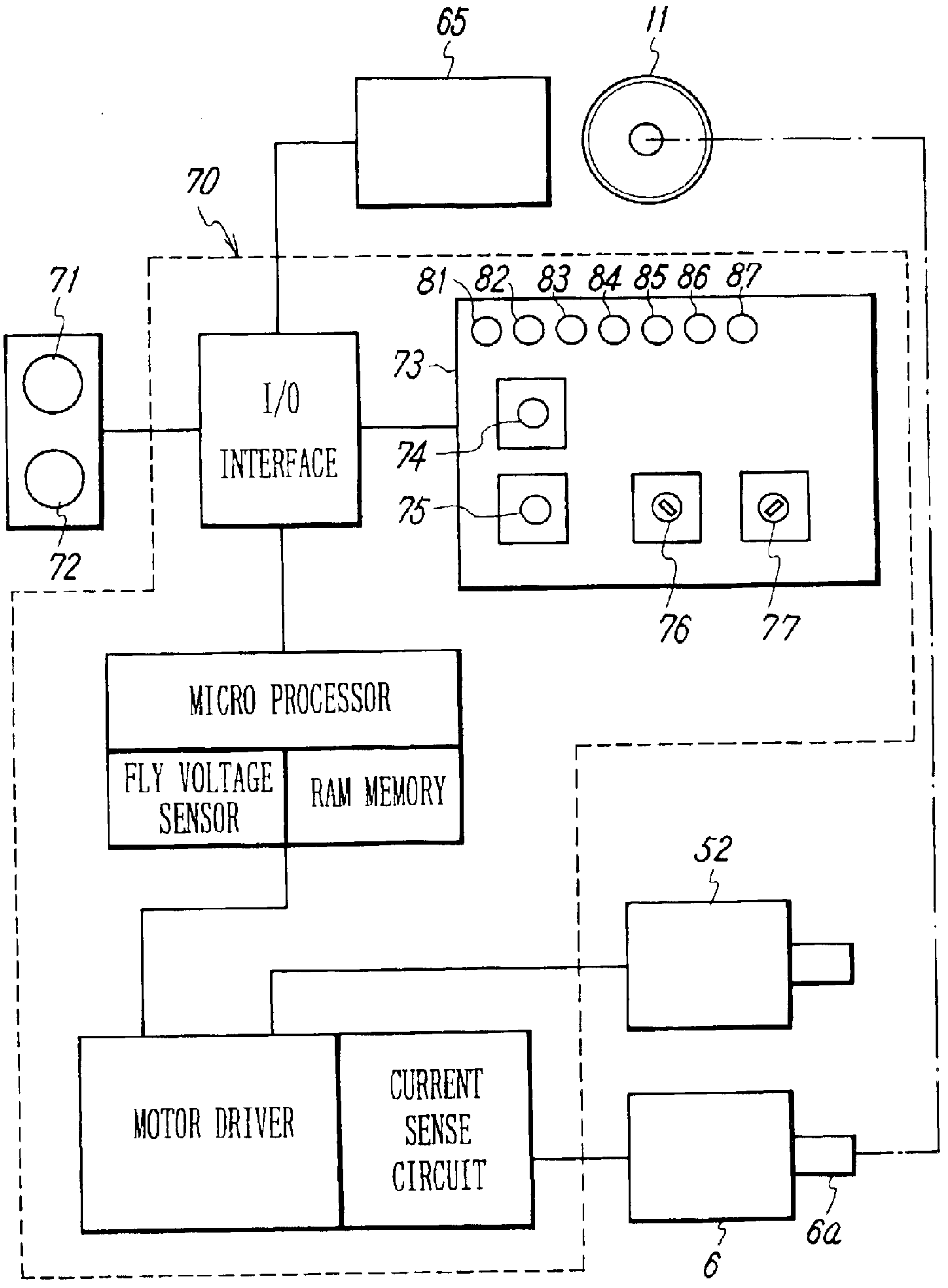
FIG. 14 is a block diagram of a controller in the clamping device according to the invention.

The controller 70 is connected to an independently-provided sequencer or the like through an input signal connector 71 and an output signal connector 72 as shown in FIG. 4 in which a mounted state to the body 2 is shown and in a block diagram in FIG. 14 in which a conceptual structure is shown. A signal for controlling the electric clamping device 1 is input through the input signal connector 71 and a signal for confirming opening/closing of the clamp is output through the output signal connector 72. The controller 70 includes a microprocessor to which the connectors 71 and 72 are connected through an I/O interface. The position sensor 65 is connected to the microprocessor through the I/O interface and the position of the clamp arm 44 is sent to the microprocessor through the interface. A control panel 73 is connected to the microprocessor through the I/O interface. The control panel 73 is provided with setting means for setting various conditions and indicating means for indicating various operating states, abnormal conditions, and the like of the electric clamping device 1 as described later.

A fly voltage sensor for checking whether appropriate voltage is used and a RAM memory for storing various kinds of information are added to the microprocessor. By this microprocessor, driving, a stop, and a switch in a rotating direction of the electric motor 6 are controlled through a motor driver. At this time, a current for driving the electric motor 6 is detected in a current sense circuit and is fed back to the microprocessor to control the electric motor 6. A signal is also output to a solenoid 52 of the brake mechanism 50 for stopping rotation of the clamp arm shaft 40 through the motor driver.

A signal sent from the microprocessor to the motor driver to control the electric motor 6 and the solenoid 52 is output based on the signal from the position sensor 65, a set value in the setting means of the control panel 73, a signal from the RAM memory, or the signal from the input signal connector 71. For example, it is detected from the signal from the position sensor 65 that the clamp arm has reached the clamping position or an arm open position and the electric motor 6 is stopped or the solenoid 52 is caused to operate.

On the other hand, the control panel 73 is provided with the various kinds of setting means and the indicating means. As the setting means, there are a manual opening switch 74 and a manual closing switch 75 by which a worker manually opens and closes the clamp arm 44, an angle selector 76 by which the worker sets an opening angle of the clamp arm 44 when the clamp arm 44 returns, an output selector 77 by which the worker can set a total clamping force from the open state to a state 5° before the closed state of the clamp arm 44, and the like. As the indicating means, there are a plurality of indicating lights (light-emitting diodes) 81 to 87 for indicating operating conditions and abnormal conditions of the clamp arm 44. These indicating lights are provided onto an LED board 67 in a controller cover 66 mounted to a side edge of the body 2 in FIG. 4 and light emission of the indicating lights can be recognized through the controller cover 66. For example, the indicating light 81 provides an indication by monitoring the auxiliary power supply joint connector, the indicating lights 82 and 83 provide indications by monitoring input of an open signal and a close signal of the clamp arm 44, the indicating lights 84 and 85 provide indications by monitoring reaching of the open position and closed position by the clamp arm, and the indicating lights 86 and 87 are used to indicate various abnormal conditions by going on, going off, fast blinking, slow blinking, and the like of the lights.

As shown in FIG. 4, in the controller cover 66 on the one side edge of the body 2, a CPU board 68 forming a part of the microprocessor and a driver board 69 forming the motor driver in the controller 70 are housed together with the LED board 67.

With the controller 70 having the above structure, it is possible to control the electric motor 6 and the brake mechanism 50 by the microprocessor according to programs stored in the RAM memory.

What is claimed is:

1. An electric clamping device wherein an electric motor, a speed reducing mechanism formed of multistage spur gears to reduce a speed of rotation of the electric motor, a linkage connected to the speed reducing mechanism, and a clamp arm shaft to which a clamp arm connected to the linkage is mounted are retained on a body, the linkage includes a crank link which is rotatably connected at an end thereof to a crank gear formed of a last-stage spur gear of the speed reducing mechanism and which converts a rotational motion of the spur gear into a linear motion, a cam follower link rotatably connected to a tip end of the crank link and bent at an intermediate portion such that a cam follower moving on a cam rail face provided to the body is rotatably supported on the bend, and a driving lever projecting from the clamp arm shaft to be connected to a tip end of the cam follower link, and the linkage forms a toggle linkage for stably retaining a clamping force of the clamp arm together with the cam rail face.

2. An electric clamping device according to claim 1, wherein the cam rail face is formed of a linear cam face making up a major part of a length of the cam rail face and a curved cam face formed of an arc having a large radius of curvature or a curve which approximates the arc near an end portion of the cam rail face.

3. An electric clamping device according to claim 2, wherein the curved cam face is in a position where the cam follower rolls in a range of 5° immediately before a final clamping position of the clamp arm.

4. An electric clamping device according to claim 1, wherein the cam rail face is substantially formed of a linear cam face.

5. An electric clamping device according to claim 2 or 4, wherein the cam follower is a pair of rollers supported on opposite ends of a cam follower shaft provided to the cam follower link and moving while rolling on the cam rail face.

6. An electric clamping device according to claim 1 further comprising a brake mechanism for retaining the clamp arm in an open state, the brake mechanism being formed of a brake shoe made of soft material disposed so as to partially enter between cogs of a large-diameter spur gear of the speed reducing mechanism engaged with a small-diameter spur gear fixed to an output shaft of the electric motor and a solenoid for driving the brake shoe in such directions that the brake shoe comes in contact with and separates from the cogs of the spur gear.

7. An electric clamping device according to claim 6, wherein the brake shoe is a rubbery elastic body.

8. An electric clamping device according to claim 1, wherein a shaft end of a gear shaft of the large-diameter spur gear of the speed reducing mechanism engaged with the small-diameter spur gear fixed to the output shaft of the electric motor is caused to face an outside of the body and a locking portion to be rotated with a manual tool is provided to the shaft end to enable the clamp arm to be manually operated.

9. An electric clamping device according to claim 1, wherein a shaft end of a last-stage gear shaft of the speed reducing mechanism is caused to face an outside of the body, an indicator is provided to the shaft end, and an angle scale for reading a rotating angle of the indicator is provided to the body to form indicating means for indicating a rotating state of the clamp arm shaft.

10. An electric clamping device according to claim 1 further comprising a controller for controlling operation of the device, wherein an input signal connector to which a signal for controlling the electric clamping device is input, an output signal connector from which a signal for confirming opening/closing of the clamp arm is output to an outside, a position sensor for sending a signal of a position of the clamp arm, setting means for setting various driving conditions, and a control panel provided with indicating means for indicating various operating states and abnormal conditions are connected to a microprocessor in the controller through an I/O interface and the electric motor whose driving, a stop, a switch in a rotating direction are controlled and a solenoid of a brake mechanism for retaining the clamp arm in an open state are connected to the microprocessor through a motor driver.

* * * * *